United States Patent
Chang et al.

(10) Patent No.: US 11,835,725 B2
(45) Date of Patent: Dec. 5, 2023

(54) HEAD-MOUNTED DISPLAY DEVICE ASSEMBLY AND EXTERNAL ADJUSTMENT MODULE

(71) Applicant: HTC Corporation, Taoyuan (TW)

(72) Inventors: Chun-Wei Chang, Taoyuan (TW); Ying-Chieh Huang, Taoyuan (TW); Pei-Yu Su, Taoyuan (TW); Yen-Te Chiang, Taoyuan (TW); Chun-Kai Yang, Taoyuan (TW); Wei-Ting Hsiao, Taoyuan (TW); Yien-Chun Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/963,199

(22) Filed: Oct. 11, 2022

(65) Prior Publication Data
US 2023/0324699 A1 Oct. 12, 2023

Related U.S. Application Data

(60) Provisional application No. 63/342,628, filed on May 17, 2022, provisional application No. 63/328,280, filed on Apr. 7, 2022.

(51) Int. Cl.
*G02B 27/01* (2006.01)
(52) U.S. Cl.
CPC ..... *G02B 27/0176* (2013.01); *G02B 27/0172* (2013.01); *G02B 2027/0178* (2013.01); *G02B 2027/0187* (2013.01)

(58) Field of Classification Search
CPC ............ G02B 27/0176; G02B 27/0172; G02B 2027/0178; G02B 2027/0187
See application file for complete search history.

(56) References Cited

U.S. PATENT DOCUMENTS

| | | | |
|---|---|---|---|
| 2018/0338130 A1* | 11/2018 | Miller | H04N 13/327 |
| 2020/0355928 A1 | 11/2020 | Dai | |
| 2022/0099910 A1 | 3/2022 | Chang et al. | |
| 2022/0151489 A1* | 5/2022 | Khan | A61B 3/14 |

FOREIGN PATENT DOCUMENTS

| | | |
|---|---|---|
| CN | 105974588 | 9/2016 |
| TW | I697695 | 7/2020 |

\* cited by examiner

*Primary Examiner* — Robert J Michaud
(74) *Attorney, Agent, or Firm* — JCIPRNET

(57) ABSTRACT

A head-mounted display device assembly and an external adjustment module are provided. The head-mounted display device assembly includes a head-mounted display device and the external adjustment module. The head-mounted display device has a first lens and a second lens corresponding to both eyes, and also has a driven mechanism. The first lens and the second lens are respectively coupled to the driven mechanism. The external adjustment module is used for assembling and electrically connecting to the head-mounted display device, and includes a driving element and a transmission element. In a coupling state, the transmission element is coupled to the driving element and the driven mechanism, and the driving element drives the driven mechanism via the transmission element to adjust a distance between the first lens and the second lens. In a separation state, at least one of the driving element and the driven mechanism is separated from the transmission element.

18 Claims, 18 Drawing Sheets

HEAD-MOUNTED DISPLAY DEVICE ASSEMBLY AND EXTERNAL ADJUSTMENT MODULE

CROSS-REFERENCE TO RELATED APPLICATION

This application claims the priority benefit of U.S. provisional application Ser. No. 63/328,280, filed on Apr. 7, 2022, and U.S. provisional application Ser. No. 63/342,628, filed on May 17, 2022. The entirety of each of the above-mentioned patent applications is hereby incorporated by reference herein and made a part of this specification.

FIELD OF THE INVENTION

The present application relates to a head-mounted display device assembly and an external adjustment module, and more particularly, to a head-mounted display device assembly and an external adjustment module capable of adjusting interpupillary distance.

DESCRIPTION OF RELATED ART

With the rapid advancement of current technology, the types and functions of head-mounted display devices are also increasingly diversified. Taking an eye mask type head-mounted display device as an example, when a user wears such a device, the gyroscope and position tracker in the head-mounted display device track the state of the user's movement to deliver corresponding scene images, providing the user with an experience as if they were in a virtual world.

When using the head-mounted display device, since interpupillary distance of each user is different, the distance between the two lenses in the head-mounted display device needs to be adjustable, so that every user may get the best experience. Currently, the head-mounted display device mainly has the function of manually adjusting the distance between the two lenses. However, each user may not necessarily be able to adjust the two lenses to the proper position.

SUMMARY OF THE INVENTION

The present application provides a head-mounted display device assembly and an external adjustment module to provide the function of electrically adjusting interpupillary distance.

The head-mounted display device assembly of the present application includes a head-mounted display device and an external adjustment module. The head-mounted display device has a first lens and a second lens corresponding to both eyes, and also has a driven mechanism. The first lens and the second lens are respectively coupled to the driven mechanism. The external adjustment module is used for assembling and electrically connecting to the head-mounted display device, and includes a driving element and a transmission element. In a coupling state, the transmission element is coupled to the driving element and the driven mechanism, and the driving element is used for driving the driven mechanism via the transmission element to adjust a distance between the first lens and the second lens. In a separation state, at least one of the driving element and the driven mechanism is separated from the transmission element.

The external adjustment module of the present application is applied to a head-mounted display device. The external adjustment module is used for assembling and electrically connecting to the head-mounted display device. The head-mounted display device has a first lens and a second lens corresponding to both eyes, and also has a driven mechanism. The first lens and the second lens are respectively coupled to the driven mechanism. The external adjustment module includes a driving element and a transmission element. In a coupling state, the transmission element is coupled to the driving element and the driven mechanism, and the driving element is used for driving the driven mechanism via the transmission element to adjust a distance between the first lens and the second lens. In a separation state, at least one of the driving element and the driven mechanism is separated from the transmission element.

Based on the above, in the head-mounted display device assembly and the external adjustment module of the present application, the driving element is located in the external adjustment module. Therefore, the head-mounted display device equipped with the external adjustment module has the function of electrically adjusting interpupillary distance. Moreover, when the product life of the driving element is over, only the external adjustment module needs to be replaced without repairing the head-mounted display device, thus not only reducing the cost at the user's end, but also meeting the requirements of today's society for environmental protection. Moreover, since the external adjustment module may be switched between the coupling state and the separation state, even when the external adjustment module is assembled to the head-mounted display device, the user may still manually adjust the driven mechanism of the head-mounted display device to adjust the distance between the first lens and the second lens.

EMBODIMENTS

Figure 1:
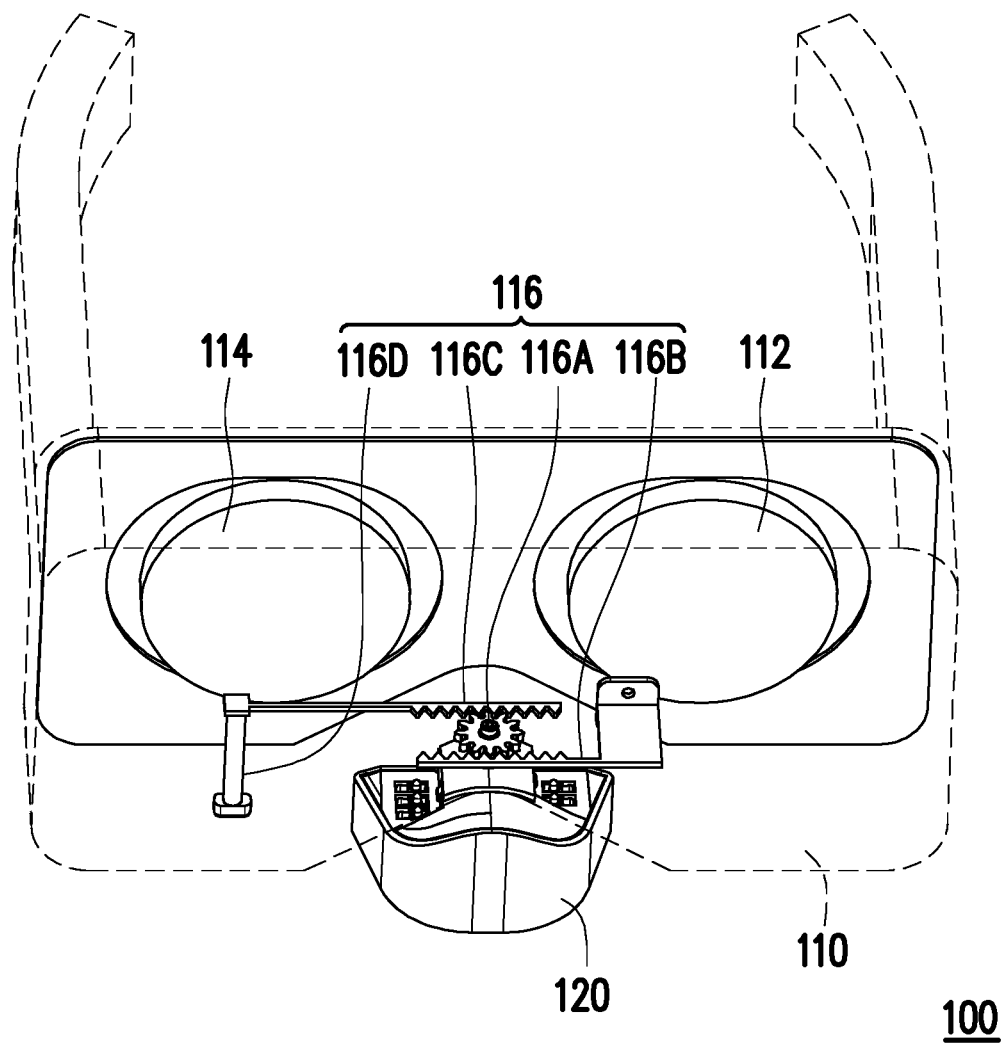
FIG. 1 is a three-dimensional perspective view of a head-mounted display device assembly of an embodiment of the invention.

FIG. 1 is a three-dimensional perspective view of a head-mounted display device assembly of an embodiment of the invention. Please refer to FIG. 1 and FIG. 2, a head-mounted display device assembly 100 of the present embodiment includes a head-mounted display device 110 and an external adjustment module 120. The head-mounted display device 110 has a first lens 112 and a second lens 114 corresponding to both eyes, and also has a driven mechanism 116. For the convenience of description, the casing of the head-mounted display device 110 in FIG. 1 is presented in a translucent manner. The first lens 112 and the second lens 114 are respectively coupled to the driven mechanism 116. The external adjustment module 120 is used for assembling and electrically connecting to the head-mounted display device 110. For example, the external adjustment module 120 may be electrically connected to the head-mounted display device 110 using a terminal 126 or a connector (not shown), but the present application is not limited thereto. Therefore, the head-mounted display device 110 may supply power or control the operation of the external adjustment module 120.

When wearing the head-mounted display device assembly 100, the distance between the first lens 112 and the second lens 114 may be adjusted by using the external adjustment module 120 to ensure that both eyes may be aligned with the first lens 112 and the second lens 114, thus reducing the occurrence of blurred and out-of-focus images and improving visual experience.

Figure 2:
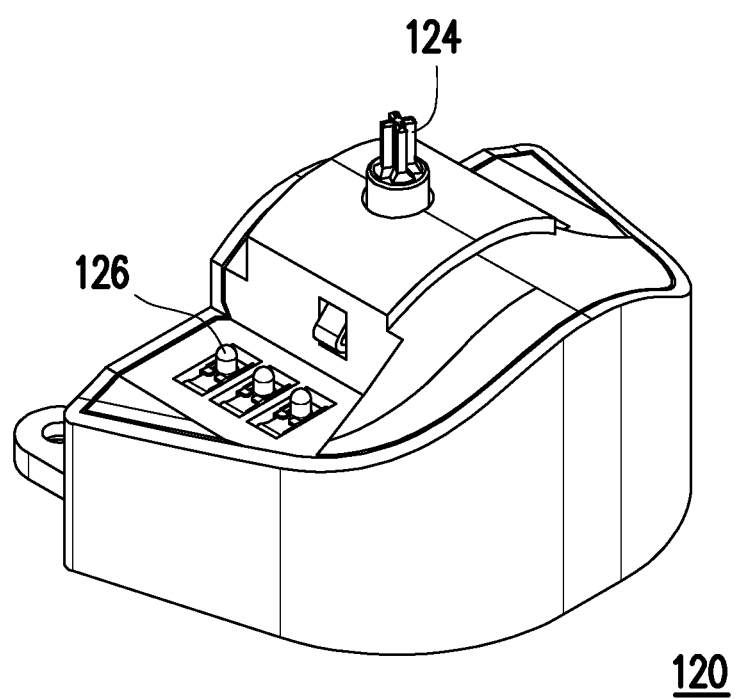
FIG. 2 is a schematic diagram of the external adjustment module of FIG. 1.
Figure 3:
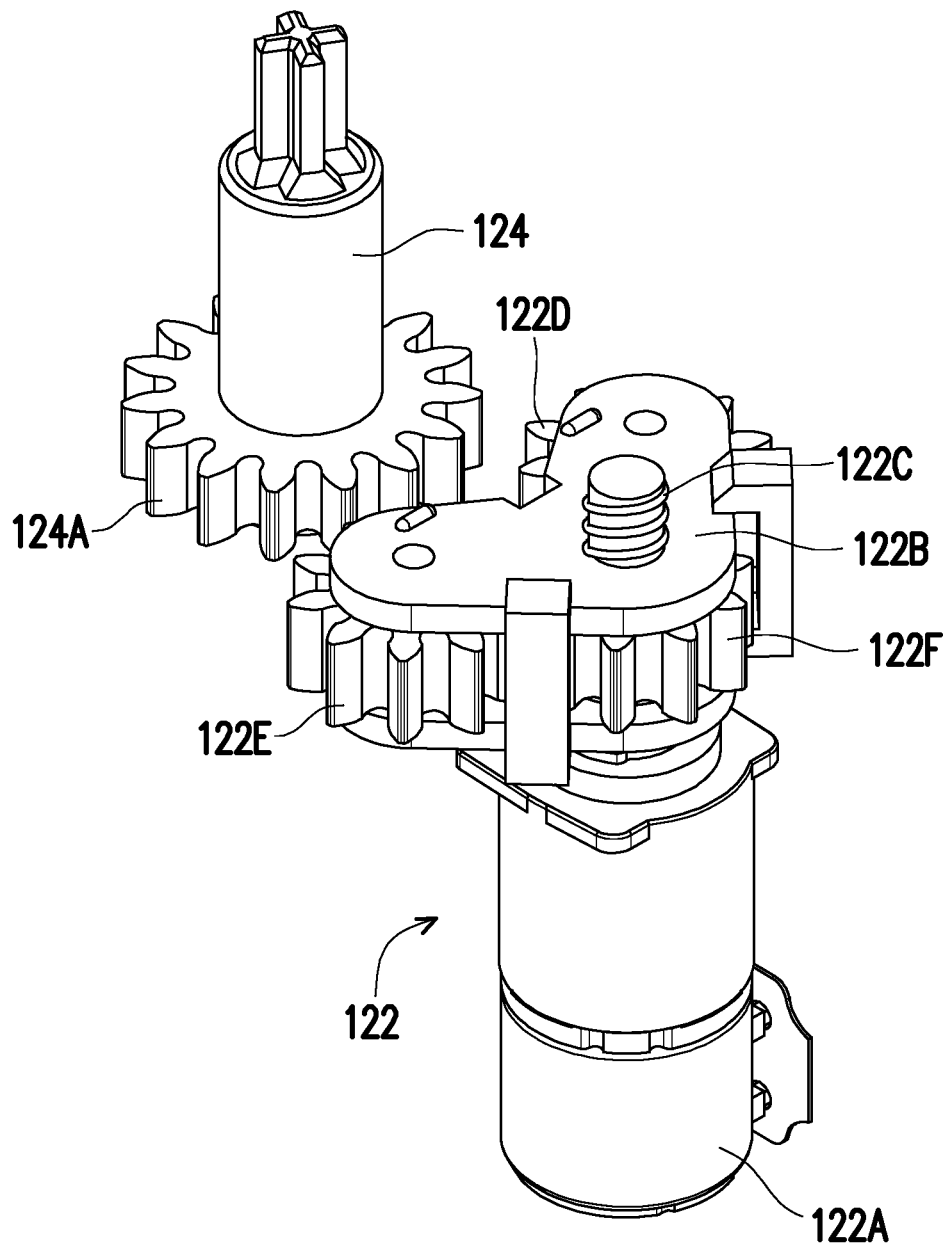
FIG. 3 is a schematic diagram of some elements of the external adjustment module of FIG. 2.

FIG. 3 is a schematic diagram of some elements of the external adjustment module 120 of FIG. 2. Please refer to FIG. 1 and FIG. 3, the external adjustment module 120 of the present embodiment includes a driving element 122 and a transmission element 124. The transmission element 124 of the present embodiment is an example of a gear, wherein an end is used for engaging the driving element 122 and the other end is used for engaging the driven mechanism 116, but the present application is not limited thereto. In more detail, the transmission element 124 has a transmission gear 124A for engaging the driving element 122.

In the head-mounted display device assembly 100 of the present embodiment, the driving element 122 is disposed in the external adjustment module 120. Therefore, when the driving element 122 is damaged due to excessive usage or other reasons, the original head-mounted display device 110 may continue to be used as long as the external adjustment module 120 is replaced with a new one. In this way, not only may the cost at the user's end be reduced, but also the requirements of the current society for environmental protection are met.

Figure 4A:
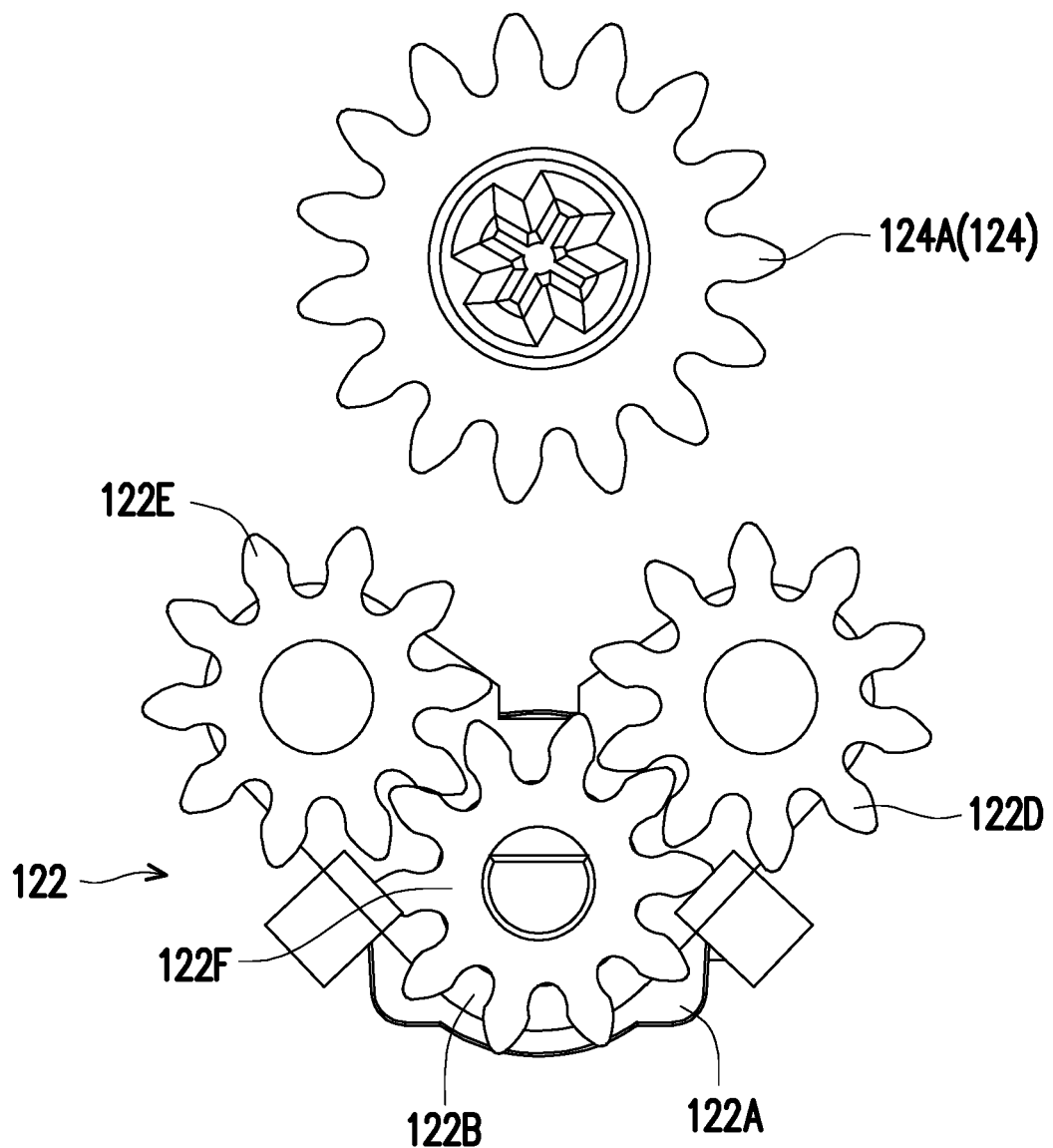
FIG. 4A is a schematic diagram of some elements of the external adjustment module of FIG. 2 in a separation state.

FIG. 4A is a schematic diagram of some elements of the external adjustment module 120 of FIG. 2 in a separation state. Referring to FIG. 1 and FIG. 4A, in the separation state, at least one of the driving element 122 and the driven mechanism 166 is separated from the transmission element 124. In the present embodiment, although the external adjustment module 120 is assembled to the head-mounted display device 110 and the transmission element 124 is coupled to the driven mechanism 116, the driving element 122 is separated from the transmission element 124. Therefore, in this separation state, even if the driving element 122 is turned on, the transmission element 124 may not be driven, and of course the driven mechanism 116 may not be driven to adjust the distance between the first lens 112 and the second lens 114. In other words, even when the external adjustment module 120 is assembled to the head-mounted display device 110, the user may still manually adjust the driven mechanism 116 of the head-mounted display device 110 to adjust the distance between the first lens 112 and the second lens 114. At this time, even when the user manually adjusts the driven mechanism 116 of the head-mounted display device 110, the driving element 122 may not be driven, thus preventing the resistance generated by the driving element 122 from affecting the manual adjustment function and preventing the driving element 122 from being damaged due to external force rotation.

Figure 4B:
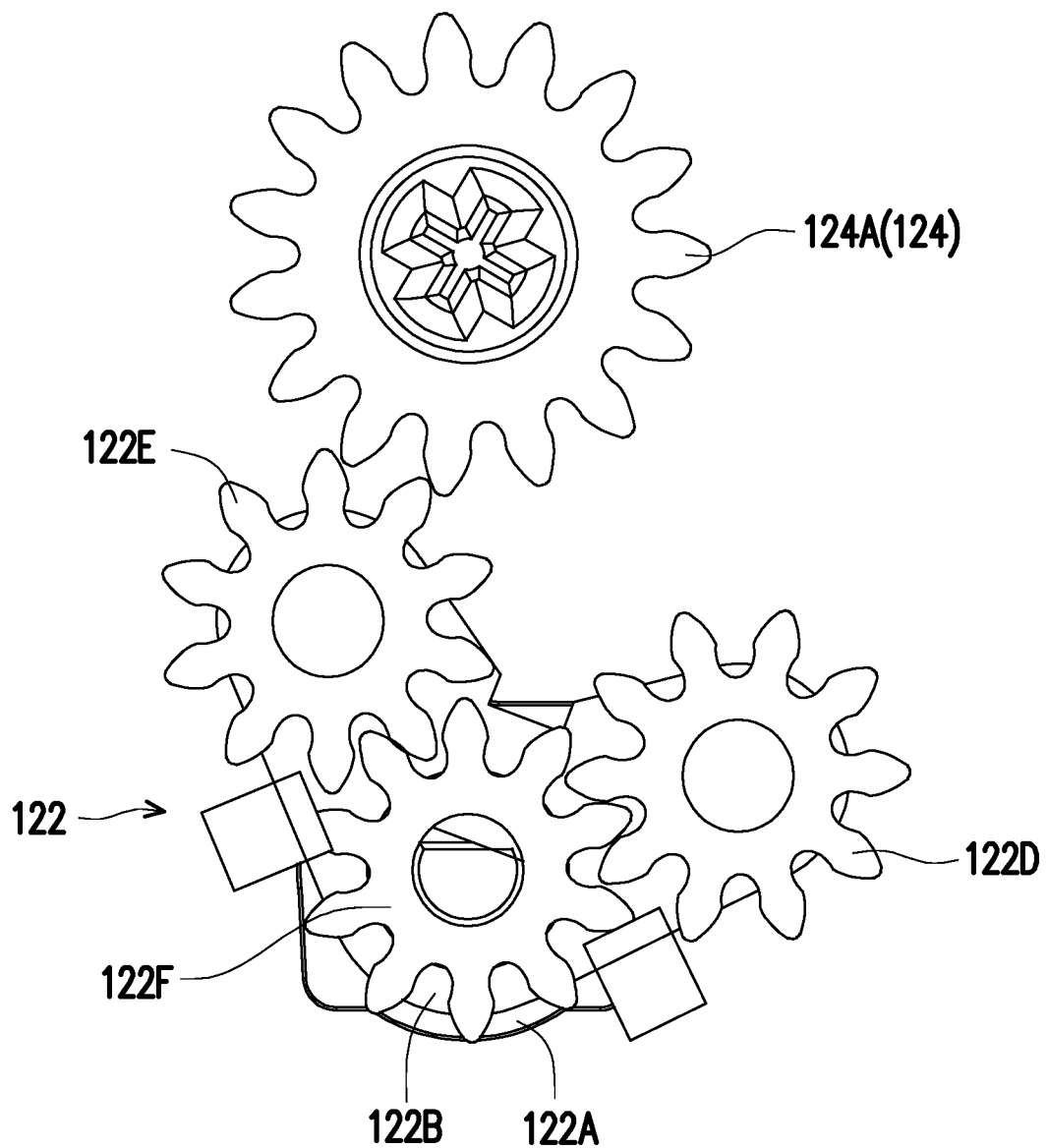
FIG. 4B and FIG. 4C are two schematic diagrams of some elements of the external adjustment module of FIG. 2 in a coupling state.
Figure 4C:
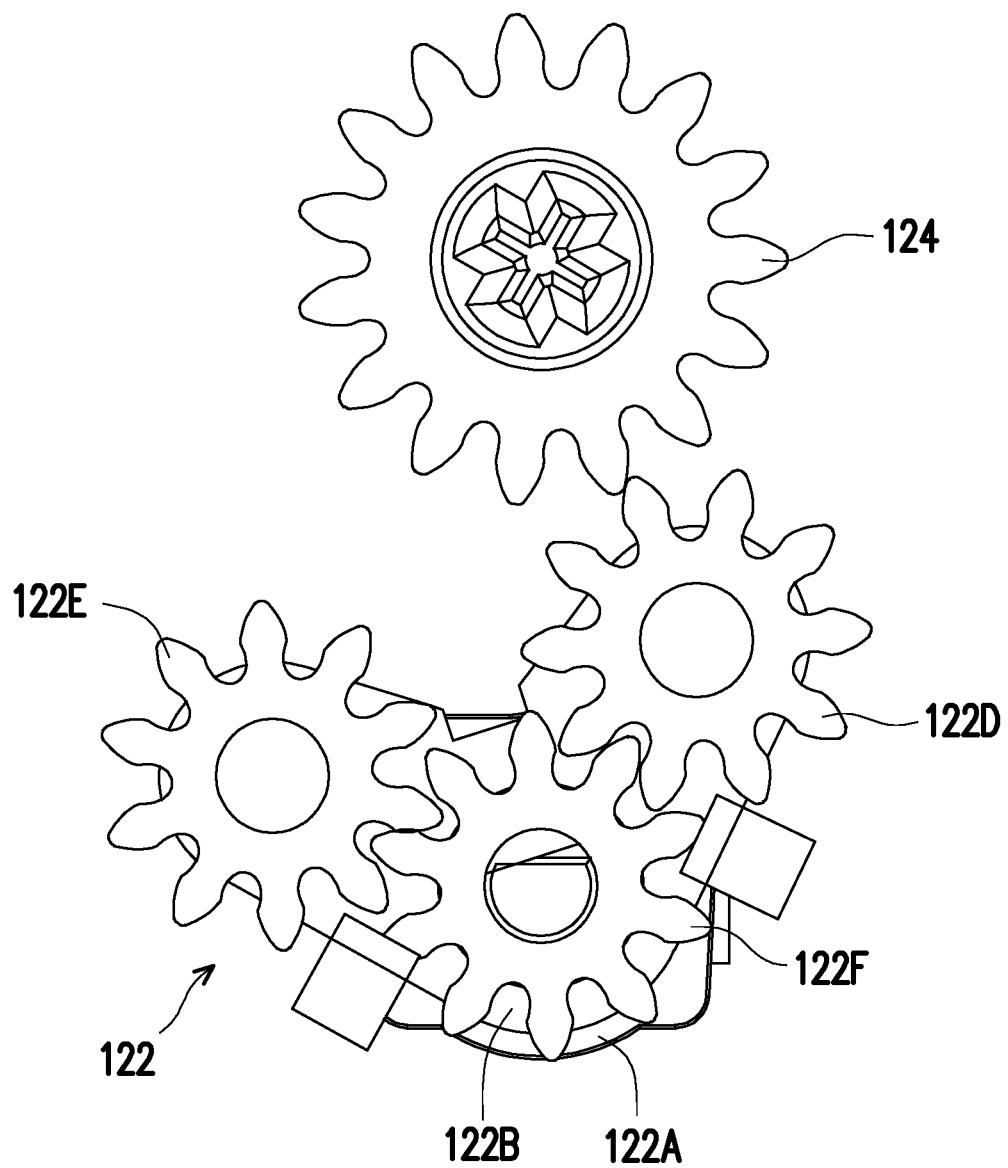

FIG. 4B and FIG. 4C are two schematic diagrams of some elements of the external adjustment module 120 of FIG. 2 in a coupling state. Referring to FIG. 1 and FIG. 4B, in the coupling state, the transmission element 124 is coupled to the driving element 122 and the driven mechanism 116. Therefore, when the driving element 122 is turned on, the driven mechanism 116 may be driven by the transmission element 124 to adjust the distance between the first lens 112 and the second lens 114.

Referring to FIG. 1 and FIG. 4C, also in the coupling state, the transmission element 124 is coupled to the driving element 122 and the driven mechanism 116 in different ways. Turning on the driving element 122 may also drive the driven mechanism 116 via the transmission element 124 to adjust the distance between the first lens 112 and the second lens 114.

For example, both the first lens 112 and the second lens 114 are slidable. The first lens 112 is connected to a rack 116B of the driven mechanism 116. The second lens 114 is connected to a rack 116C of the driven mechanism 116. The rack 116B and the rack 116C are both engaged with a gear 116A of the driven mechanism 116. When the gear 116A is rotated, the first lens 112 and the second lens 114 may be driven closer to or away from each other by the rack 116B and the rack 116C. Additionally, the transmission element 124 is coupled to the gear 116A of the driven mechanism 116. Therefore, the driving element 122 may drive the gear 116A to be rotated via the transmission element 124 to achieve the object of adjusting the distance between the first lens 112 and the second lens 114.

When the user wants to use the external adjustment module 120 to perform the function of adjusting interpupillary distance, the external adjustment module 120 is first assembled to the head-mounted display device 110. Then, the head-mounted display device 110 may execute the corresponding software. The software, for example, provides an interface for the user to decide whether to increase or decrease the distance between the first lens 112 and the second lens 114. According to the user's instruction, the driving element 122 is activated to drive the transmission element 124, thereby driving the first lens 112 and the second lens 114 to move to change the distance between the first lens 112 and the second lens 114. Then, the user may adjust the distance between the first lens 112 and the second lens 114 again according to the change of the clarity of the observed picture until the user may see the clearest picture.

In the head-mounted display device assembly 100 and the external adjustment module 120 of the present embodiment, even if the external adjustment module 120 is assembled to the head-mounted display device 110, the external adjustment module 120 may still be switched between the coupling state and the separation state, providing the user with greater operational flexibility. In other words, even when the external adjustment module 120 is assembled to the head-mounted display device 110, the user may still manually adjust the driven mechanism 116 of the head-mounted display device 110 to adjust the distance between the first lens 112 and the second lens 114.

Referring to FIG. 3 and FIG. 4A, in an embodiment of the invention, the driving element 122 includes a driver 122A, a gear frame 122B, an elastic element 122C, a first gear 122D, a second gear 122E, and a third gear 122F. The driver 122A is a stepper motor having a micro reducer as an example, but the driver 122A may also be a brush motor, a DC brushless motor, a servo motor, an AC brushless motor, etc., but not limited thereto. The gear frame 122B is pivotally connected to the driver 122A. That is, the gear frame 122B may be rotated relative to the driver 122A. The elastic element 122C is connected to the gear frame 122B. An end of the elastic element 122C may be used to only abut the gear frame 122B, or may be fixed to the gear frame 122B. The first gear 122D, the second gear 122E, and the third gear 122F are all disposed at the gear frame 122B, and may be rotated at a fixed position on the gear frame 122B. The third gear 122F is connected to the driver 122A and engaged with the first gear 122D and the second gear 122E. That is, the third gear 122F is a rotating shaft fixed to the driver 122A.

Referring to FIG. 1 and FIG. 4A, in the separation state, the elastic element 122C maintains the gear frame 122B, so that the first gear 122D and the second gear 122E are both separated from the transmission gear 124A of the transmission element 124. Even if the gear frame 122B is rotated to the position where the first gear 122D is engaged with the transmission gear 124A of the transmission element 124 or the second gear 122E is engaged with the transmission gear 124A of the transmission element 124 at the previous moment, the elastic element 122C also rotates the gear frame 122B with the elastic restoring force of the elastic element 122C to maintain the gear frame 122B at the position where the first gear 122D and the second gear 122E are both separated from the transmission gear 124A of the transmission element 124. However, the present application is not limited thereto, and the position of the gear frame 122B may also be restored via the driver 122A without using the elastic element 122C.

In the present embodiment, the driven mechanism 116 has a manual control element 116D for the user to drive the driven mechanism 116 via the manual control element 116D in the separation state to adjust the distance between the first lens 112 and the second lens 114. That is, when the gear frame 122B is maintained at a position where both the first gear 122D and the second gear 122E are separated from the transmission gear 124A of the transmission element 124, the user may directly manipulate the manual control element 116D, thereby driving the driven mechanism 116 to adjust the distance between the first lens 112 and the second lens 114. In this way, when the user does not want to use the driving element 122 to adjust the distance between the first lens 112 and the second lens 114 in an electric manner, the exposed portion of the manual control element 116D may also be directly pulled to move the first lens 112 and the second lens 114. Moreover, in the process of pulling the manual control element 116D, the user does not need to apply unnecessary force to rotate the driving element 122 because the transmission element 124 is separated from the transmission gear 124A of the driving element 122.

The manual control element 116D is, for example, connected to the rack 116C. When the user pulls the manual control element 116D, the second lens 114 connected to the rack 116C may be driven to move. At this time, the rack 116C also drives the rack 116B to move via the gear 116A, and then the rack 116B drives the first lens 112 to move, so as to achieve the object of adjusting the distance between the first lens 112 and the second lens 114. In other embodiments, the manual control element 116 may also be a gear set or other mechanisms so as to drive the driven mechanism 116 to adjust the distance between the first lens 112 and the second lens 114.

Referring to FIG. 3 and FIG. 4B, in the coupling state, the driver 122A rotates the gear frame 122B so that the first gear 122D or the second gear 122E is engaged with the transmission gear 124A of the transmission element 124, and the driver 122A drives the third gear 122F. Specifically, when the driver 122A is rotated, the third gear 122F is rotated. Moreover, the gear frame 122B may also be rotated depending on the frictional force between the rotating shaft of the driver 122A and the gear frame 122B, or the frictional force between the third gear 122F and the gear frame 122B. When the third gear 122F is rotated clockwise from the state of FIG. 4A, the gear frame 122B is also rotated clockwise, so that the second gear 122E is in contact with and engaged with the transmission gear 124A of the transmission element 124. At this time, the gear frame 122B may not continue to be rotated, but the driver 122A may continue to drive the third gear 122F to drive the second gear 122E and the transmission gear 124A of the transmission element 124 in sequence, and the driven mechanism 116 is driven by the transmission element 124 to drive the first lens 112 and the second lens 114 to move closer to each other, so as to achieve the object of adjusting interpupillary distance.

Referring to FIG. 3 and FIG. 4C, also in the coupling state, when the third gear 122F is rotated counterclockwise from the state of FIG. 4A, the gear frame 122B is also rotated counterclockwise, so that the first gear 122D is in contact with and engaged with the transmission gear 124A of the transmission element 124. At this time, the gear frame 122B may not continue to be rotated, but the driver 122A may continue to drive the third gear 122F to drive the first gear 122D and the transmission gear 124A of the transmission element 124 in sequence, and the driven mechanism 116 is driven by the transmission element 124 to drive the first lens 112 and the second lens 114 to move away from each other, so as to achieve the object of adjusting interpupillary distance.

Figure 5A:
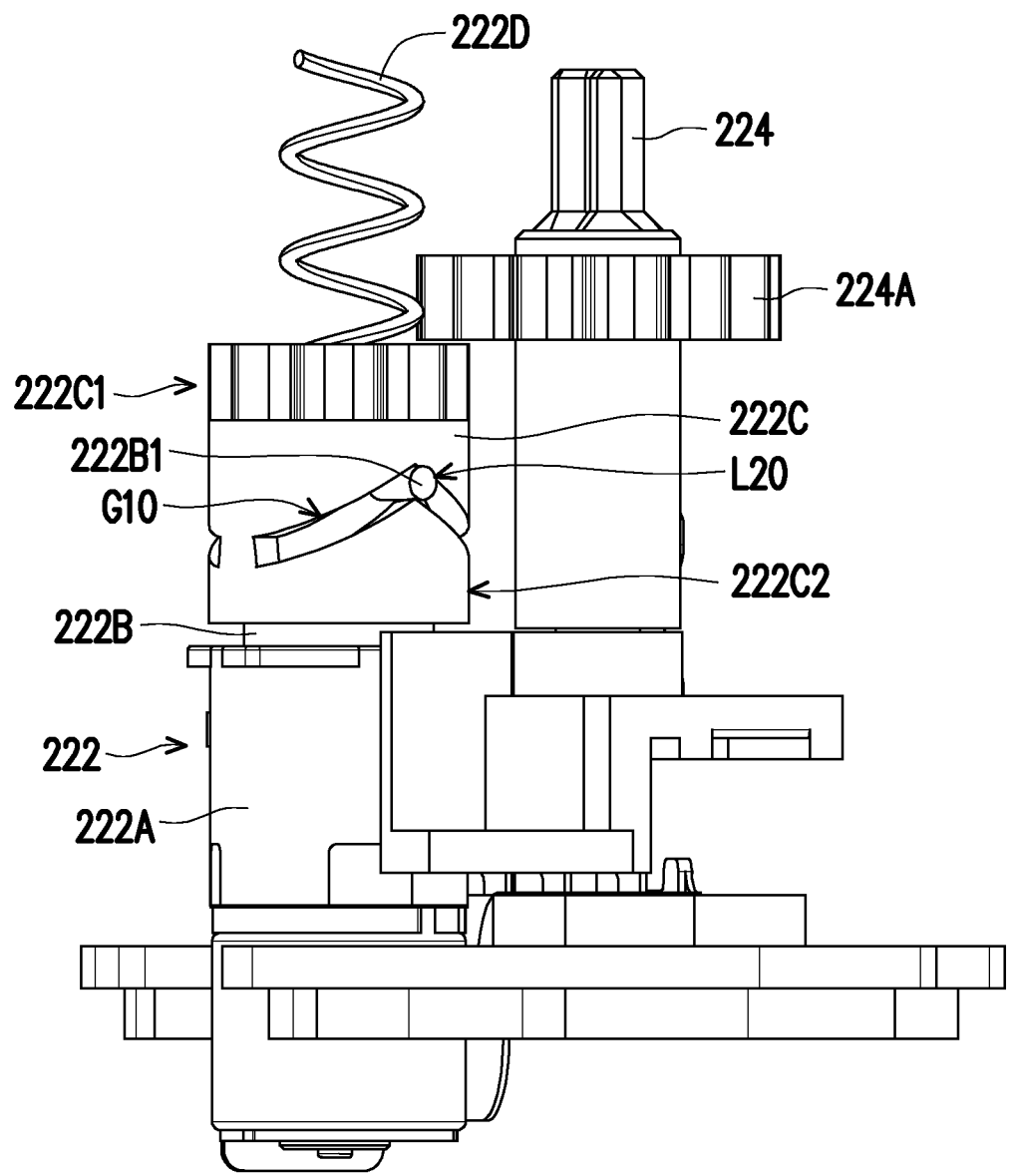
FIG. 5A and FIG. 5B are schematic diagrams of some elements of the external adjustment module in a separation state and a coupling state, respectively, of another embodiment of the invention.
Figure 5B:
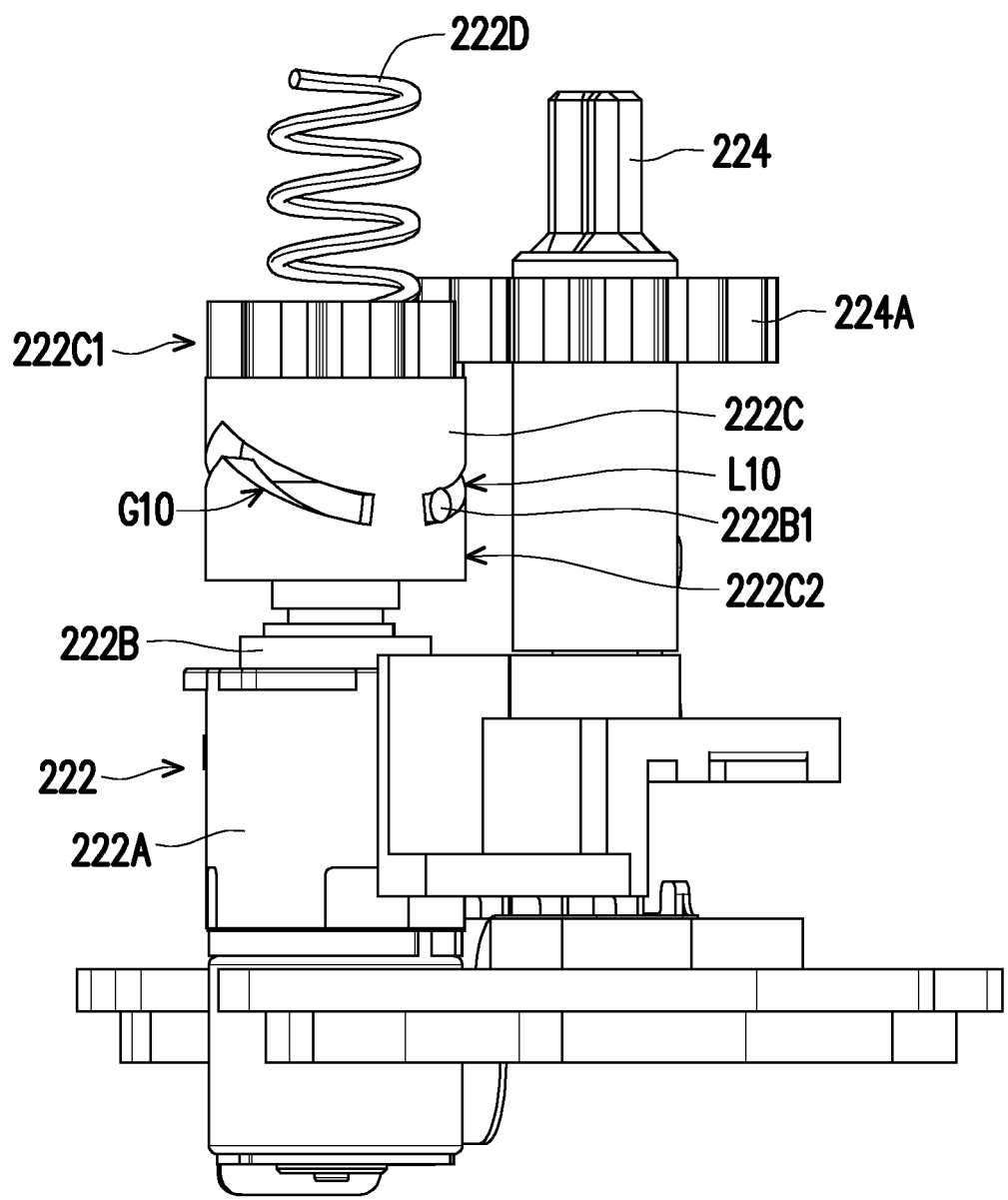

FIG. 5A and FIG. 5B are schematic diagrams of some elements of the external adjustment module in a separation state and a coupling state, respectively, of another embodiment of the invention. Referring to FIG. 5A, the head-mounted display device assembly of the present embodiment is similar to the head-mounted display device assembly 100 of FIG. 1, and only the differences between the two are described here. In the present embodiment, a driving element 222 includes a driver 222A, a guide rod 222B, a transmission gear 222C, and an elastic element 222D. The guide rod 222B is connected to the driver 222A and has a guide pin 222B1. That is, the guide rod 222B is a rotating shaft fixed to the driver 222A. The transmission gear 222C has a gear side 222C1 and a guide rail side 222C2, and the guide rail side 222C2 is sleeved on the guide rod 222B. That is, the transmission gear 222C may be rotated relative to the guide rod 222B. The guide pin 222B1 is slidably arranged in a guide rail G10 of the guide rail side 222C2. The elastic element 222D is connected to the transmission gear 222C. An end of the elastic element 222D may be used to only abut the transmission gear 222C, or may be fixed to the transmission gear 222C. In the separation state, the elastic element 222D actuates the transmission gear 222C to separate the transmission gear 222C from the transmission gear 224A of the transmission element 224. In the present embodiment, the elastic restoring force of the elastic element 222D is applied to the transmission gear 222C to maintain the transmission gear 222C at a lower position, thus maintaining the transmission gear 222C and the transmission gear 224A of the transmission element 224 in the separation state.

Referring to FIG. 5B, in the coupling state, the driver 222A rotates the guide rod 222B to move the guide pin 222B1 to a first position L10 of the guide rail G10 to push the transmission gear 222C so as to engage the transmission gear 222C with the transmission gear 224A of the transmission element 224. Specifically, when the driver 222A rotates the guide rod 222B, the guide pin 222B1 is also moved accordingly. However, the height of the guide pin 222B1 relative to the driver 222A is not changed. Therefore, when the guide pin 222B1 is moved from a second position L20 shown in FIG. 5A that is relatively far from the guide rail G10 to the first position L10 shown in FIG. 5B that is relatively close to the driver 222A, the transmission gear 222C is also pushed in a direction away from the driver 222A, so that the transmission gear 222C is engaged with the transmission gear 224A of the transmission element 224. Next, the driver 222A continues to rotate the guide rod 222B, the guide pin 222B1 drives the transmission gear 224A of the transmission element 224 to move via the transmission gear 222C, and the driven mechanism 116 shown in FIG. 1 is driven by the transmission element 224 to drive the first lens 112 and the second lens 114 to move relative to each other, so as to achieve the object of adjusting interpupillary distance. In an embodiment of the invention, the guide rail G10 is V-shaped, but the present application is not limited thereto.

Figure 6A:
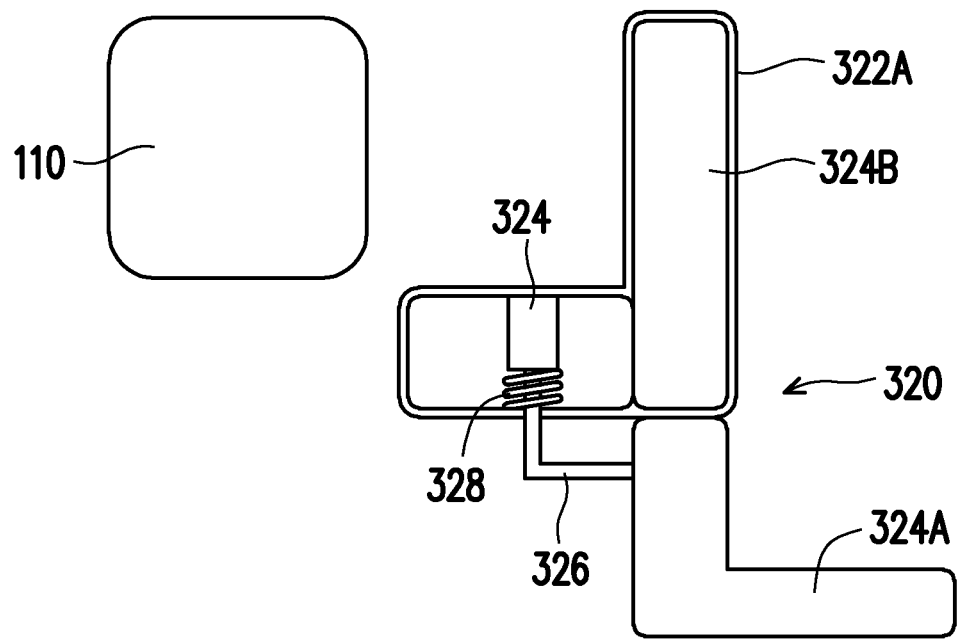
FIG. 6A and FIG. 6B are schematic diagrams of a head-mounted display device assembly before assembly and in a coupling state, respectively, of another embodiment of the invention.
Figure 6B:
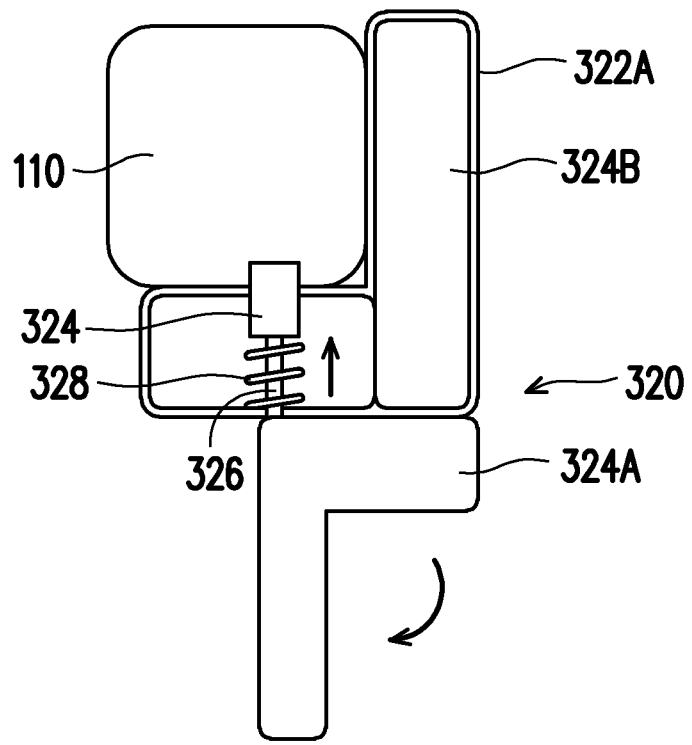

FIG. 6A and FIG. 6B are schematic diagrams of a head-mounted display device assembly before assembly and in a coupling state, respectively, of another embodiment of the invention. Referring to FIG. 6A and FIG. 6B, the head-mounted display device assembly of the present embodiment is similar to the head-mounted display device assembly 100 of FIG. 1, and only the differences between the two are described here. In the present embodiment, an external adjustment module 320 further includes an outer frame 322A, a lip tracking element 324A, a pull cord 326, and an elastic element 328. The outer frame 322A corresponds to the first lens (not shown) and the second lens (not shown) of the head-mounted display device 110. That is, the external adjustment module 320 of the present embodiment has the functions of adjusting interpupillary distance and lip tracking at the same time. In addition, the external adjustment module 320 of the present embodiment may further include an eye tracking element 324B also disposed in the outer frame 322A. Therefore, the head-mounted display device 110 may drive the external adjustment module 320 to automatically adjust interpupillary distance based on the eyeball image captured by the eyeball tracking element 324B. The external adjustment module 320 of the present embodiment may have multiple functions at the same time. Users only need to perform one installation step to obtain multiple functions, the assembly is simple, the appearance is also simple and concise, the number of parts is reduced, and the weight may also be reduced.

The lip tracking element 324A is pivotally connected to the outer frame 322A for tracking the lip. Therefore, the lip tracking element 324A may be properly folded when not performing lip tracking, and may be turned over to a position suitable for tracking the lip when lip tracking is needed. The pull cord 326 is connected to the lip tracking element 324A and the transmission element 324. Thus, when the lip tracking element 324A is turned over to a position away from the driving element 324, the lip tracking element 324A may pull the driving element 324 via the pull cord 326. The elastic element 328 is disposed between the outer frame 322A and the transmission element 324. Therefore, when the lip tracking element 324A is turned over to a position close to the transmission element 324, the elastic element 328 may bring the transmission element 324 back to the position before he transmission element 324 is pulled by the pull cord 326.

Figure 7A:
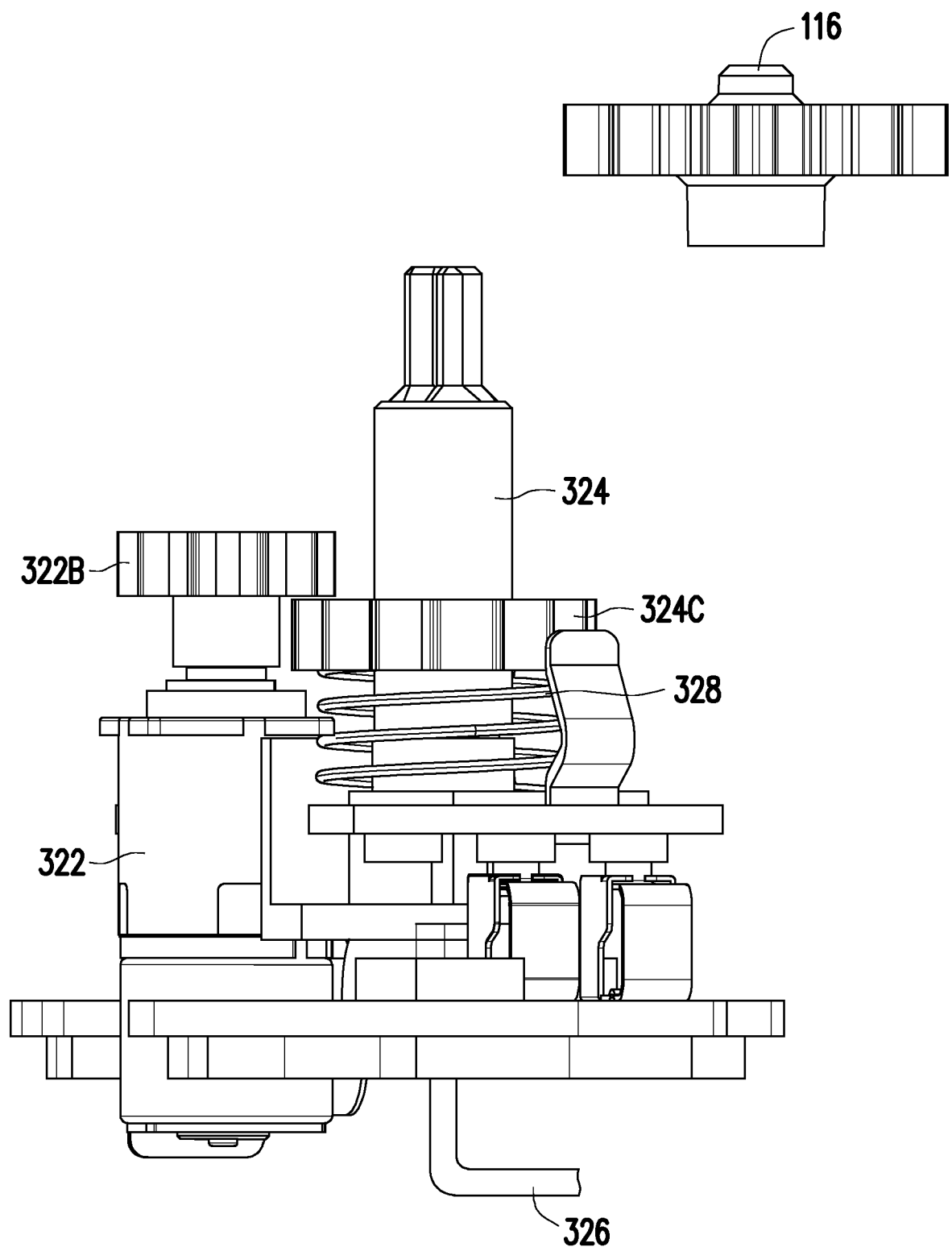
FIG. 7A, FIG. 7B, and FIG. 7C are schematic diagrams of some elements of the external adjustment module of FIG. 6A before assembly, in a separation state, and in a coupling state, respectively.
Figure 7B:
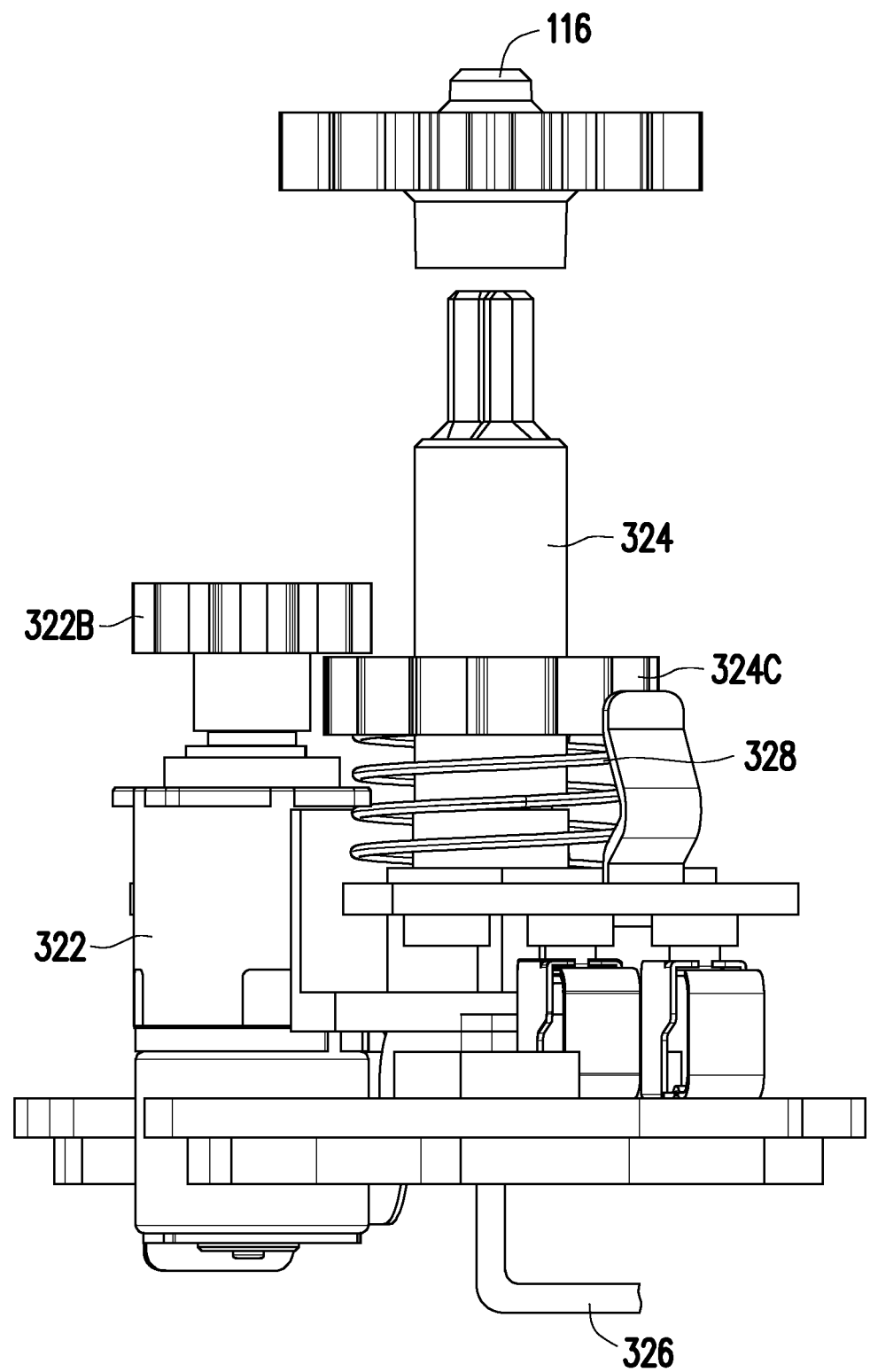
Figure 7C:
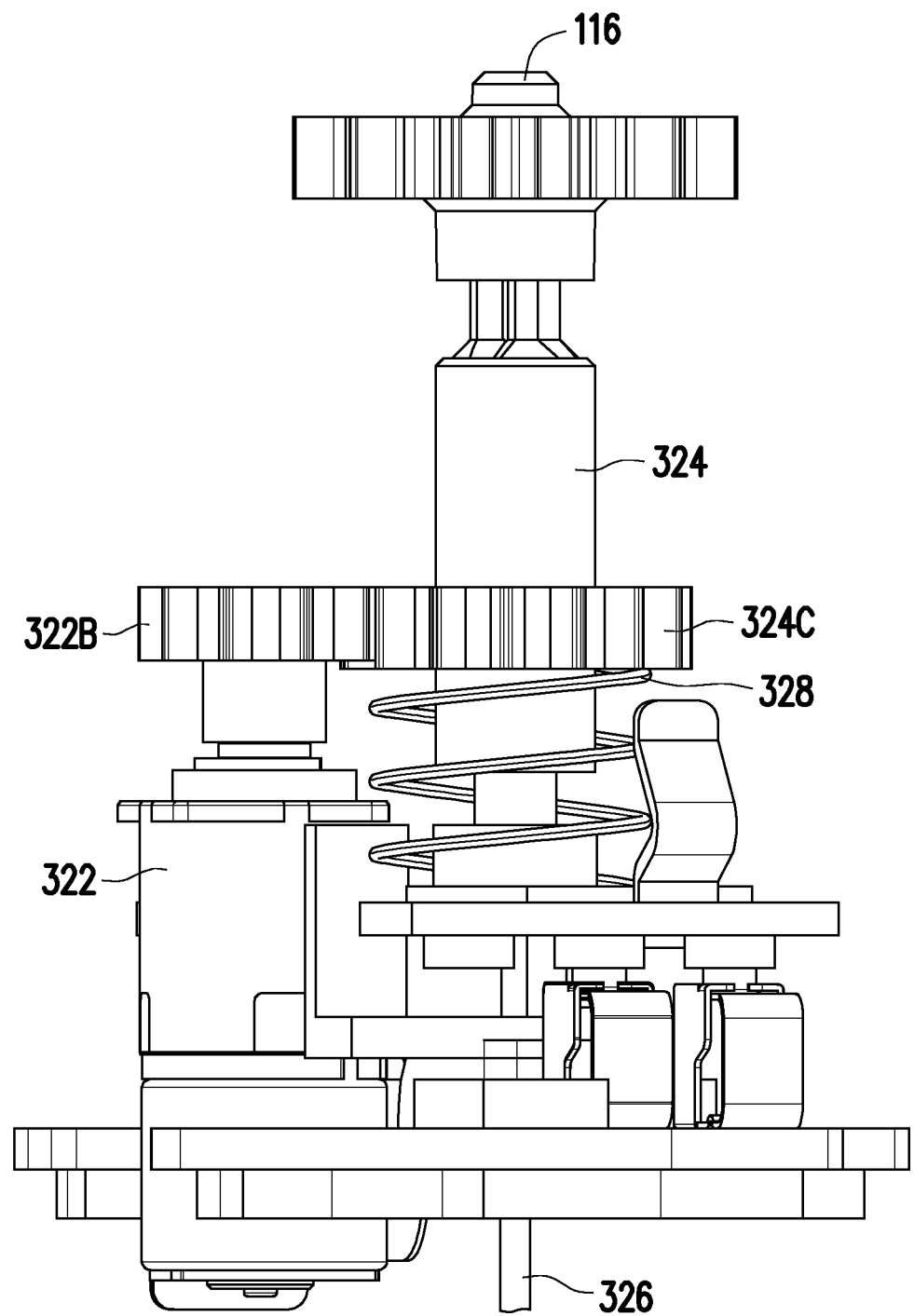

FIG. 7A, FIG. 7B, and FIG. 7C are schematic diagrams of some elements of the external adjustment module of FIG. 6A before assembly, in a separation state, and in a coupling state, respectively. Please refer to FIG. 6A and FIG. 7A, before assembly, the lip tracking element 324A is located at a position away from the transmission element 324, and the transmission element 324 is pulled by the pull cord 326 and is not protruded beyond the outer frame 322A, so as to avoid affecting the assembly of the external adjustment module 320 and the head-mounted display device 110.

Referring to FIG. 7B, after assembly is complete and in the separation state, the lip tracking element 324A still pulls the transmission element 324 via the pull cord 326 to separate the transmission element 324 from the driven mechanism 116. In the present embodiment, the pull cord 326 pulls the transmission element 324 to a lower position, thus maintaining the transmission gear 322B and the transmission gear 324C of the transmission element 324 in the separation state.

Referring to FIG. 6B and FIG. 7C, after assembly is complete and in the coupling state, the lip tracking element 324A is located at a position close to the transmission element 324, so the pull cord 326 is in a relaxed state. At this time, the elastic element 328 actuates the transmission element 324 to couple the transmission element 324 to the driving element 322 and the driven mechanism 116 via the transmission gear 322B. In the present embodiment, the transmission element 324 is pushed by the elastic element 328 to protrude beyond the outer frame 322A, so as to be coupled to the driven mechanism 116, and is also coupled to the driving element 322 via the transmission gear 322B. Therefore, the driving element 322 may drive the transmission gear 324C of the transmission element 324 via the transmission gear 322B, and drive the driven mechanism 116 via the transmission element 324 to drive the first lens 112 and the second lens 114 as shown in FIG. 1 to move relative to each other to achieve the object of adjusting interpupillary distance. In other words, the user may switch on and off the function of electrically adjusting interpupillary distance while turning the lip tracking element 324A.

Figure 8A:
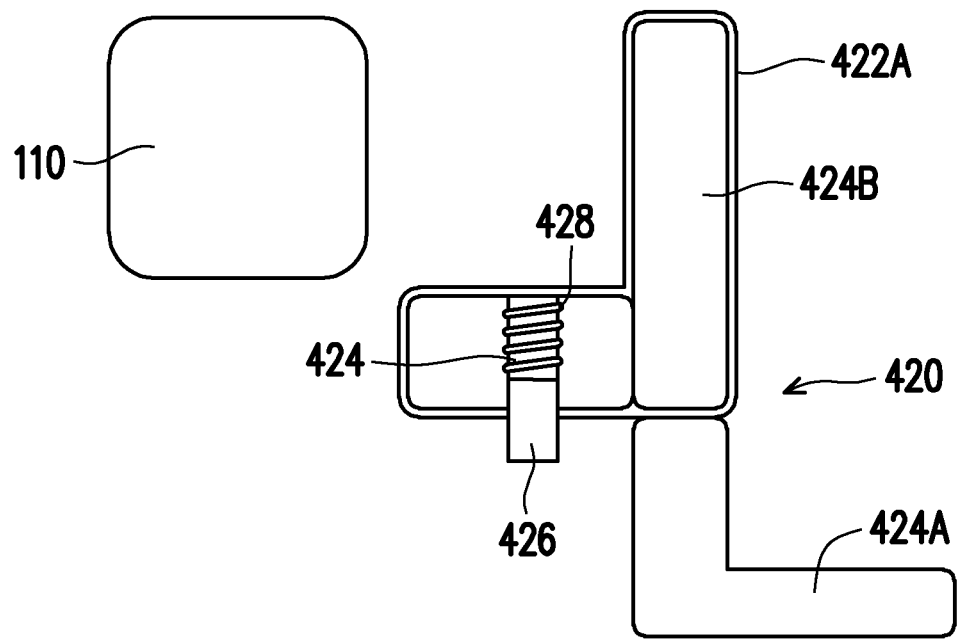
FIG. 8A and FIG. 8B are schematic diagrams of a head-mounted display device assembly before assembly and in a coupling state, respectively, of another embodiment of the invention.
Figure 8B:
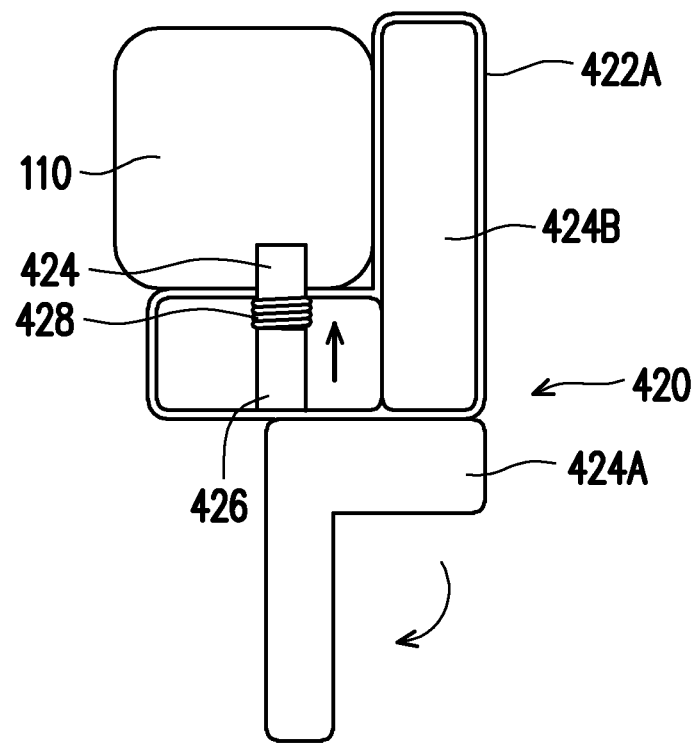

FIG. 8A and FIG. 8B are schematic diagrams of a head-mounted display device assembly before assembly and in a coupling state, respectively, of another embodiment of the invention. Referring to FIG. 8A and FIG. 8B, the head-mounted display device assembly of the present embodiment is similar to the head-mounted display device assembly 100 of FIG. 1, and only the differences between the two are described here. In the present embodiment, an external adjustment module 420 further includes an outer frame 422A, a lip tracking element 424A, an ejector rod 426, and an elastic element 428. The outer frame 422A corresponds to the first lens (not shown) and the second lens (not shown) of the head-mounted display device 110. That is, the external adjustment module 420 of the present embodiment has the functions of adjusting interpupillary distance and lip tracking at the same time. In addition, the external adjustment module 420 of the present embodiment may further include an eye tracking element 424B also disposed in the outer frame 422A. Therefore, the head-mounted display device 110 may drive the external adjustment module 420 to automatically adjust interpupillary distance based on the eyeball image captured by the eyeball tracking element 424B. The external adjustment module 420 of the present embodiment may have multiple functions at the same time. Users only need to perform one installation step to obtain multiple functions, the assembly is simple, the appearance is also simple and concise, the number of parts is reduced, and the weight may also be reduced.

The lip tracking element 424A is pivotally connected to the outer frame 422A for tracking the lip. Therefore, the lip tracking element 424A may be properly folded when not performing lip tracking, and may be turned over to a position suitable for tracking the lip when lip tracking is needed. Two ends of the ejector rod 426 are respectively used for contacting the lip tracking element 424A and the transmission element 424 (shown in FIG. 9A). Therefore, when the lip tracking element 424A is turned over to a position close to the ejector rod 426, the lip tracking element 424A may push the ejector rod 426, and the ejector rod 426 pushes the transmission element 424. The elastic element 428 is disposed between the outer frame 422A and the transmission element 424. Therefore, when the lip tracking element 424A is turned over to a position away from the ejector rod 426, the elastic element 428 may bring the transmission element 424 back to the position where the transmission element 424 is not pushed by the ejector rod 426.

Figure 9A:
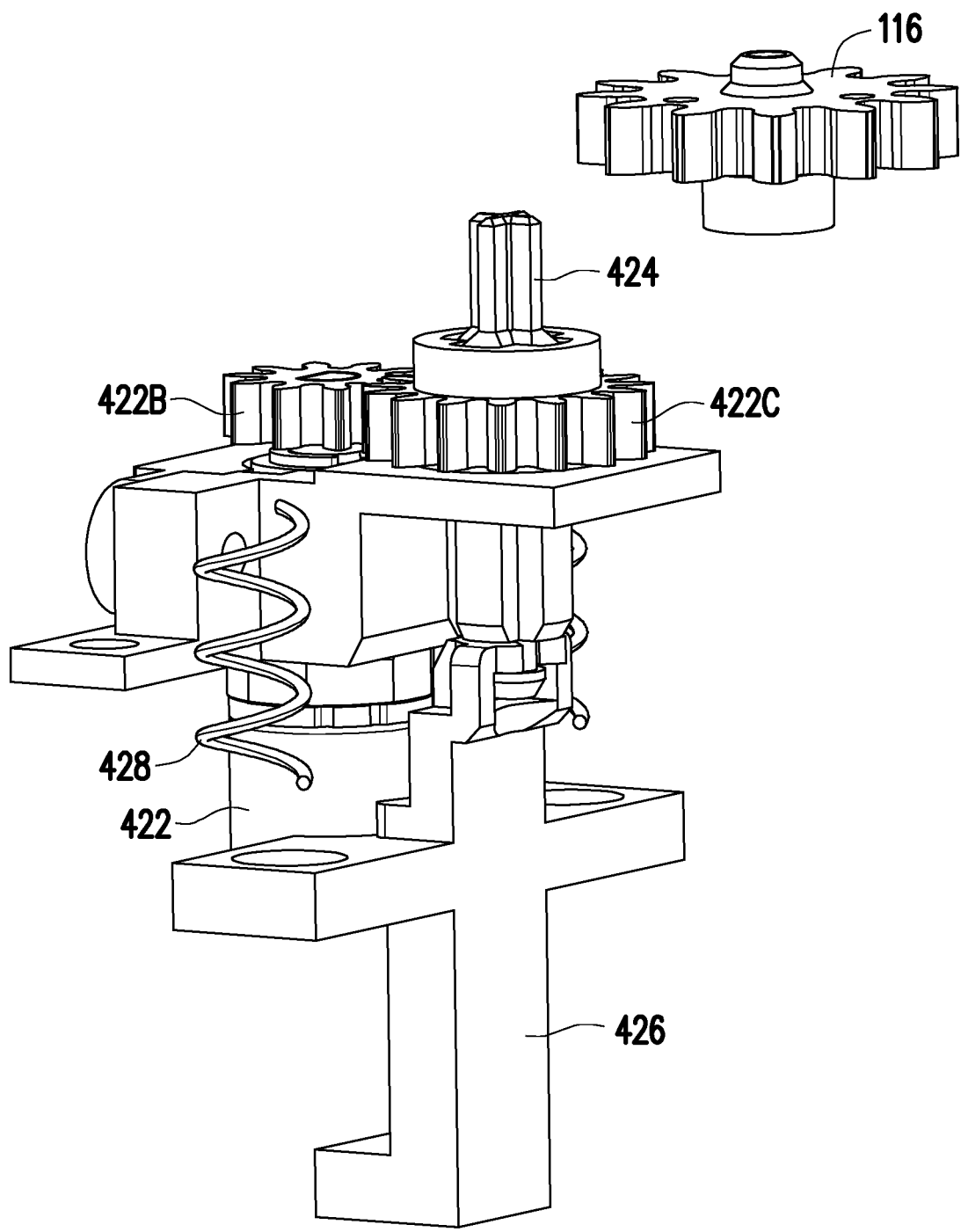
FIG. 9A, FIG. 9B, and FIG. 9C are schematic diagrams of some elements of the external adjustment module of FIG. 8A before assembly, in a separation state, and in a coupling state, respectively.
Figure 9B:
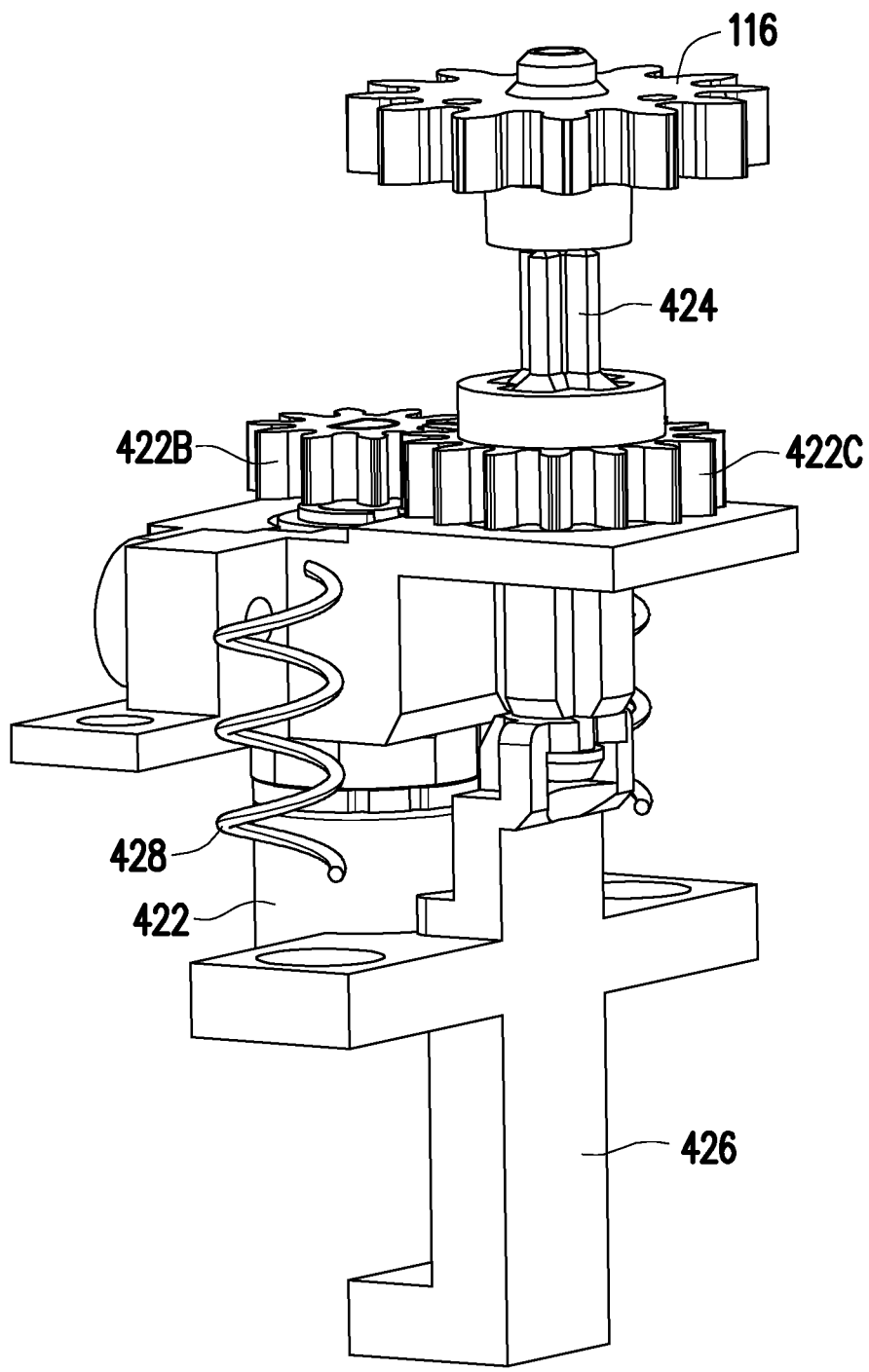
Figure 9C:
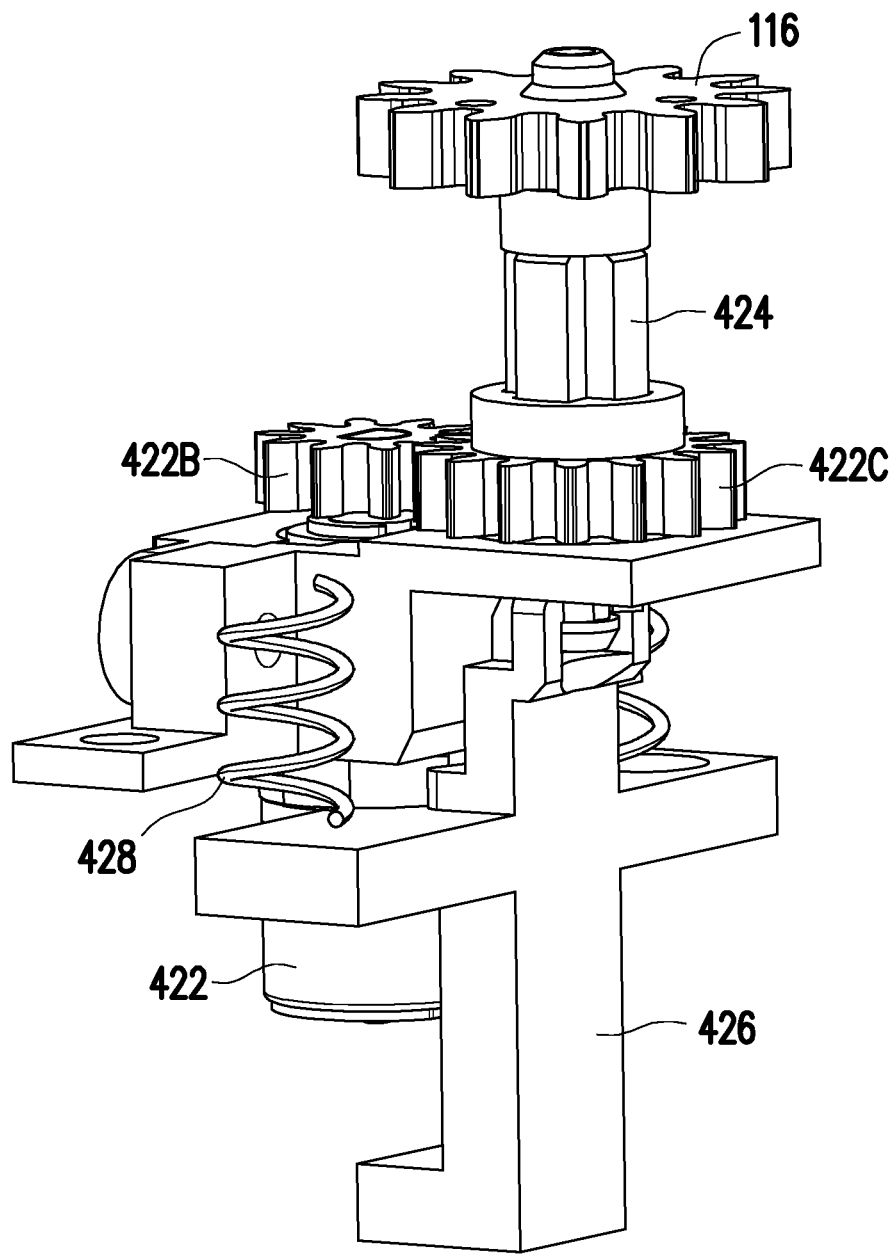

FIG. 9A, FIG. 9B, and FIG. 9C are schematic diagrams of some elements of the external adjustment module 120 of the head-mounted display device of FIG. 8A before assembly, in a separation state, and in a coupling state, respectively. Please refer to FIG. 8A and FIG. 9A, before assembly, the lip tracking element 424A is located at a position away from the ejector rod 426, and the ejector rod 426 is pushed by the elastic member 428 to be protruded downward beyond the outer frame 422A. Therefore, the transmission element 424 is not protruded upward beyond the outer frame 422A, so as to avoid affecting the assembly of the external adjustment module 420 and the head-mounted display device 110.

Referring to FIG. 9B, when assembly is complete and in the separation state, the ejector rod 426 is still in the state of being released by the lip tracking element 424A. Via the action of the elastic element 428, the transmission element 424 is not pushed by the ejector rod 426 and protruded upward beyond the outer frame 422A, so as to separate the transmission element 424 from the driven mechanism 116. At this time, although the driving element 422 is coupled to the transmission element 424 via the transmission gear 422B and the transmission gear 422C, the transmission element 424 is separated from the driven mechanism 116. Therefore, even if the driving element 422 is actuated, the driven mechanism 116 may not be driven.

Referring to FIG. 8B and FIG. 9C, after assembly is complete and in the coupling state, the lip tracking element 424A is positioned close to and against the ejector rod 426 so that the ejector rod 426 is pushed upward. At this time, the ejector rod 426 is pressed against the transmission element 424 to couple the transmission element 424 to the driving element 422 and the driven mechanism 116. In the present embodiment, the transmission element 424 is pushed by the ejector rod 426 to protrude beyond the outer frame 422A, so as to be coupled to the driven mechanism 116 and to the driving element 422 at the same time. Therefore, the driving element 422 may drive the transmission element 424 via the transmission gear 422B and the transmission gear 422C, and the driven mechanism 116 is driven by the transmission element 424 to drive the first lens 112 and the second lens 114 as shown in FIG. 1 to move with each other to achieve the object of adjusting interpupillary distance. In other words, the user may switch on and off the function of electrically adjusting interpupillary distance while turning the lip tracking element 424A.

Figure 10A:
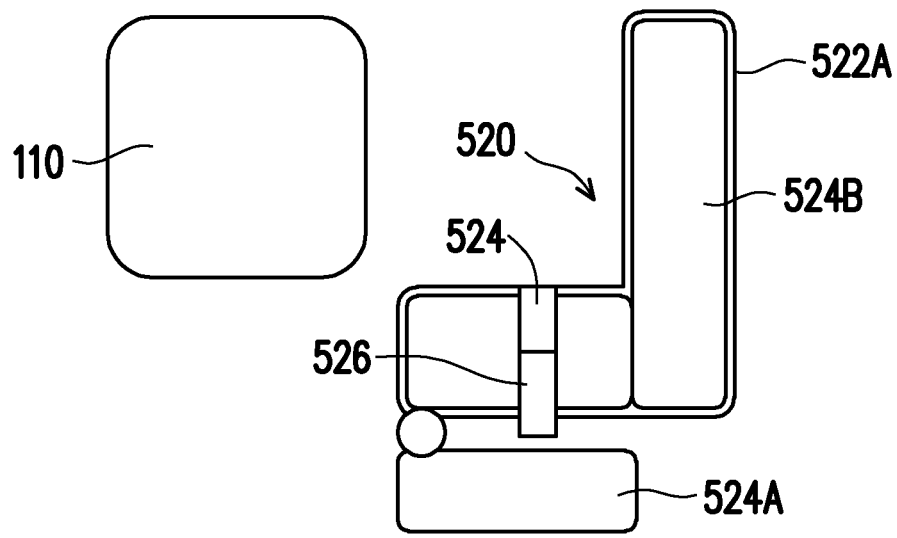
FIG. 10A, FIG. 10B, FIG. 10C, and FIG. 10D are schematic diagrams of a head-mounted display device assembly in four states of another embodiment of the invention, respectively.
Figure 10B:
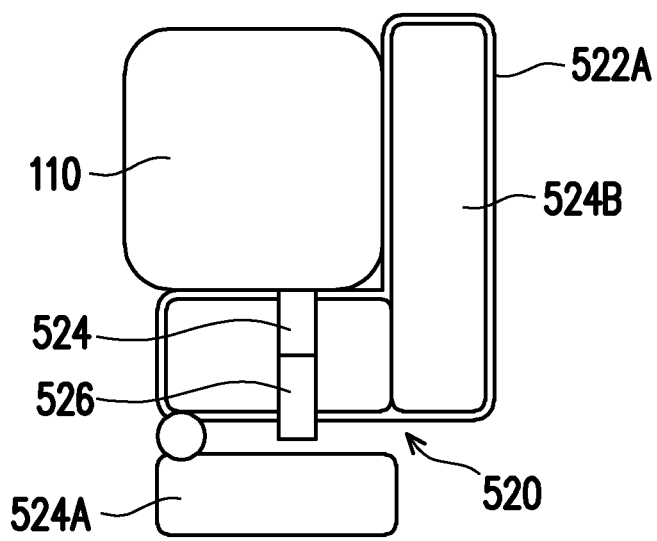
Figure 10C:
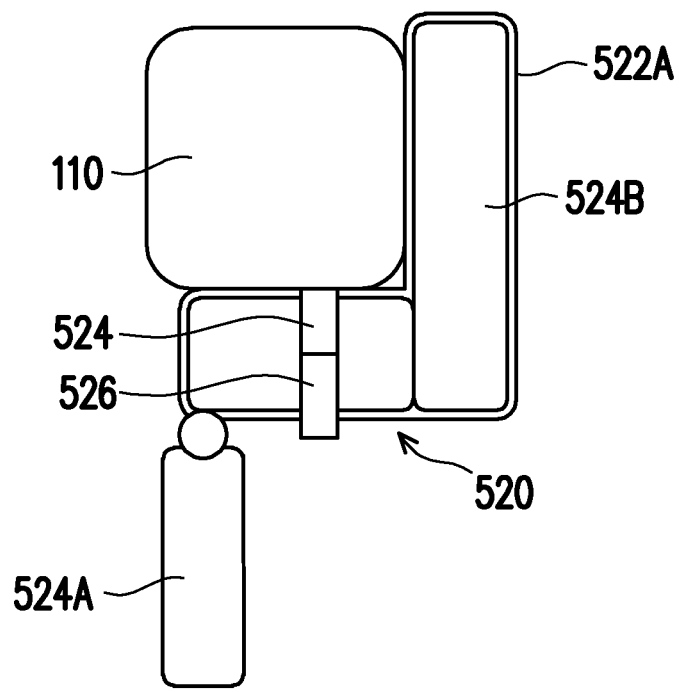
Figure 10D:
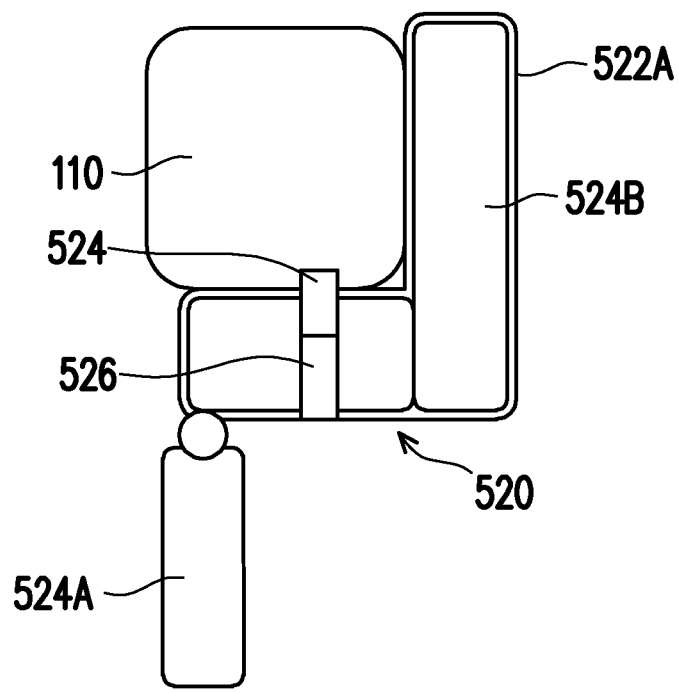

FIG. 10A, FIG. 10B, FIG. 10C, and FIG. 10D are schematic diagrams of a head-mounted display device assembly in four states of another embodiment of the invention, respectively. The head-mounted display device assembly of the present embodiment is similar to the head-mounted display device assembly 100 of FIG. 8A and FIG. 8B, and only the differences between the two are described here. Please refer to FIG. 10A, before assembly, a lip tracking element 524A of an external adjustment module 520 of the present embodiment is also pivotally connected to an outer frame 522A and used for tracking the lip, but the turning of the lip tracking element 524A is not related to an ejector rod 526. That is, the lip tracking element 524A is not in contact with the ejector rod 526 even if the lip tracking element 524A is in the position shown in FIG. 10A. Referring to FIG. 10B, after assembly is complete, the lip tracking element 524A is still in the original position, and the ejector rod 526 does not push the transmission member 524 upward. The outer frame 522A corresponds to the first lens (not shown) and the second lens (not shown) of the head-mounted display device 110. Referring to FIG. 10C, after assembly is complete and in the separation state, the lip tracking element 524A is turned over to another position, and the ejector rod 526 does not push the transmission element 524 upward, but the user may touch the ejector rod 526. Referring to FIG. 10D, after assembly is complete and in the coupling state, the user may manually push the ejector rod 526 to push the transmission element 524 upward and couple the driving element (not shown) in the external adjustment module 520 with the driven mechanism (not shown) in the head-mounted display device. Therefore, the driving element may drive the driven mechanism 116 via the transmission element 524 to drive the first lens 112 and the second lens 114 as shown in FIG. 1 to move relative to each other, so as to achieve the object of adjusting interpupillary distance. In other words, the ejector rod 526 is used to be manually switched to the coupling state or the separation state to enable or disable the function of electrically adjusting interpupillary distance. In other embodiments, other mechanism designs, such as a horizontally sliding lever or a knob, may also be used to push the ejector rod 526 out.

As in the above embodiments, the external adjustment module 520 of the present embodiment may further include an eye tracking element 524B also disposed in the outer frame 522A. Therefore, the head-mounted display device 110 may drive the external adjustment module 520 to automatically adjust interpupillary distance based on the eyeball image captured by the eyeball tracking element 524B.

Based on the above, in the head-mounted display device assembly and the external adjustment module of the present application, the head-mounted display device assembly having the external adjustment module has the function of electrically adjusting interpupillary distance. Even if the driving element having a shorter product life is damaged, the head-mounted display device does not need to be discarded, and only the external adjustment module needs to be replaced. Moreover, when the head-mounted display device already provides the function of manually adjusting interpupillary distance, if the user does not want to use the external adjustment module, they may also not purchase the external adjustment module. In this way, the needs of different users may be met, and also the requirements of today's society for environmental protection may also be met. Moreover, the external adjustment module may also optionally be provided with a lip tracking element, and the turning of the lip tracking element may also optionally become a mechanism for switching on and off the function of electrically adjusting interpupillary distance. Or, it is also possible to use the design of the driving element to automatically couple the driving element to the transmission element during movement to enable the function of electrically adjusting interpupillary distance, or provide a manual switch for the user to manually enable the function of electrically adjusting interpupillary distance.

What is claimed is:

1. A head-mounted display device assembly, comprising:
a head-mounted display device having a first lens and a second lens corresponding to both eyes, and also having a driven mechanism, wherein the first lens and the second lens are respectively coupled to the driven mechanism; and
an external adjustment module for detachably assembling and electrically connecting to the head-mounted display device, wherein the external adjustment module comprises an outer frame, a driving element and a transmission element, the outer frame corresponds to the first lens and the second lens,
in a coupling state, the transmission element is coupled to the driving element and the driven mechanism, and the driving element is used for driving the driven mechanism via the transmission element to adjust a distance between the first lens and the second lens,
in a separation state, at least one of the driving element and the driven mechanism is separated from the transmission element.

2. The head-mounted display device of claim 1, wherein the external adjustment module further comprises a lip tracking element, an ejector rod, and an elastic element, the lip tracking element is pivotally connected to the outer frame and used for tracking a lip, two ends of the ejector rod are respectively used for contacting the lip tracking element and the transmission element, and the elastic element is disposed between the outer frame and the transmission element,
in the coupling state, the lip tracking element pushes the ejector rod against the transmission element so as to couple the transmission element to the driving element and the driven mechanism,
in the separation state, the lip tracking element is turned over and away from the ejector rod, and the elastic element pulls the transmission element to separate the transmission element from the driven mechanism.

3. The head-mounted display device of claim 1, wherein the external adjustment module further comprises a lip tracking element, a pull cord, and an elastic element, the lip tracking element is pivotally connected to the outer frame and used for tracking a lip, the pull cord is connected to the lip tracking element and the transmission element, and the elastic element is disposed between the outer frame and the transmission element,
in the coupling state, the lip tracking element relaxes the pull cord, and the elastic element actuates the transmission element to couple the transmission element to the driving element and the driven mechanism,
in the separation state, the lip tracking element is turned over and pulls the transmission element via the pull cord to separate the transmission element from the driven mechanism.

4. The head-mounted display device assembly of claim 1, wherein the driving element comprises:
a driver;
a gear frame pivotally connected to the driver;
an elastic element connected to the gear frame;
a first gear disposed at the gear frame;
a second gear disposed at the gear frame; and
a third gear disposed at the gear frame and connected to the driver and engaged with the first gear and the second gear, wherein
in the coupling state, the driver rotates the gear frame so that the first gear or the second gear is engaged with the transmission element, and the driver drives the third gear,
in the separation state, the elastic element maintains the gear frame, so that both the first gear and the second gear are separated from the transmission element.

5. The head-mounted display device assembly of claim 1, wherein the driving element comprises:
a driver;
a guide rod connected to the driver and having a guide pin;
a transmission gear having a gear side and a guide rail side and sleeved on the guide rod via the guide rail side, wherein the guide pin is slidably arranged in a guide rail of the guide rail side; and
an elastic element connected to the transmission gear, wherein
in the coupling state, the driver rotates the guide rod to move the guide pin to a first position of the guide rail, so as to push the transmission gear to be engaged with the transmission element,
in the separation state, the elastic element actuates the transmission gear to separate the transmission gear from the transmission element.

6. The head-mounted display device assembly of claim 5, wherein the guide rail is V-shaped.

7. The head-mounted display device assembly of claim 1, wherein the driven mechanism has a manual control element for a user to drive the driven mechanism via the manual control element in the separation state to adjust the distance between the first lens and the second lens.

8. The head-mounted display device assembly of claim 1, wherein the external adjustment module further comprises an ejector rod, the ejector rod is used for manually switching to the coupling state or the separation state, and an end of the ejector rod is used for contacting the transmission element,
in the coupling state, the ejector rod pushes out the transmission element so as to couple the transmission element to the driving element and the driven mechanism,
in the separation state, the ejector rod is separated from the driving element and the driven mechanism.

9. The head-mounted display device assembly of claim 8, wherein the external adjustment module further comprises a lip tracking element and an eye tracking element, the lip tracking element is pivotally connected to the outer frame and used for tracking a lip, and the eye tracking element is disposed in the outer frame.

10. An external adjustment module, for detachably assembling and electrically connecting to a head-mounted display device, wherein the head-mounted display device has a first lens and a second lens corresponding to both eyes, and also has a driven mechanism, the first lens and the second lens are respectively coupled to the driven mechanism, and the external adjustment module comprises:
- an outer frame, corresponding to the first lens and the second lens;
- a driving element; and
- a transmission element, wherein
- in a coupling state, the transmission element is coupled to the driving element and the driven mechanism, and the driving element is used for driving the driven mechanism via the transmission element to adjust a distance between the first lens and the second lens,
- in a separation state, at least one of the driving element and the driven mechanism is separated from the transmission element.

11. The external adjustment module of claim 10, further comprising a lip tracking element, an ejector rod, and an elastic element, the lip tracking element is pivotally connected to the outer frame and used for tracking a lip, two ends of the ejector rod are respectively used for contacting the lip tracking element and the transmission element, and the elastic element is disposed between the outer frame and the transmission element,
- in the coupling state, the lip tracking element pushes the ejector rod against the transmission element so as to couple the transmission element to the driving element and the driven mechanism,
- in the separation state, the lip tracking element is turned over and away from the ejector rod, and the elastic element pulls the transmission element to separate the transmission element from the driven mechanism.

12. The external adjustment module of claim 10, further comprising a lip tracking element, a pull cord, and an elastic element, wherein the lip tracking element is pivotally connected to the outer frame and used for tracking a lip, the pull cord is connected to the lip tracking element and the transmission element, and the elastic element is disposed between the outer frame and the transmission element,
- in the coupling state, the lip tracking element relaxes the pull cord, and the elastic element actuates the transmission element to couple the transmission element to the driving element and the driven mechanism,
- in the separation state, the lip tracking element is turned over and pulls the transmission element via the pull cord to separate the transmission element from the driven mechanism.

13. The external adjustment module of claim 10, wherein the driving element comprises:
- a driver;
- a gear frame pivotally connected to the driver;
- an elastic element connected to the gear frame;
- a first gear disposed at the gear frame;
- a second gear disposed at the gear frame; and
- a third gear disposed at the gear frame and connected to the driver and engaged with the first gear and the second gear, wherein
- in the coupling state, the driver rotates the gear frame so that the first gear or the second gear is engaged with the transmission element, and the driver drives the third gear,
- in the separation state, the elastic element rotates the gear frame, so that both the first gear and the second gear are separated from the transmission element.

14. The external adjustment module of claim 10, wherein the driving element comprises:
- a driver;
- a guide rod connected to the driver and having a guide pin;
- a transmission gear having a gear side and a guide rail side and sleeved on the guide rod via the guide rail side, wherein the guide pin is slidably arranged in a guide rail of the guide rail side; and
- an elastic element connected to the transmission gear, wherein
- in the coupling state, the driver rotates the guide rod to move the guide pin to a first position of the guide rail, so as to push the transmission gear to be engaged with the transmission element,
- in the separation state, the elastic element actuates the transmission gear to separate the transmission gear from the transmission element.

15. The external adjustment module of claim 14, wherein the guide rail is V-shaped.

16. The external adjustment module of claim 10, wherein the driven mechanism has a manual control element for a user to drive the driven mechanism via the manual control element in the separation state to adjust a distance between the first lens and the second lens.

17. The external adjustment module of claim 10, further comprising an ejector rod, wherein the ejector rod is used for manually switching to the coupling state or the separation state, and an end of the ejector rod is used for contacting the transmission element,
- in the coupling state, the ejector rod pushes out the transmission element so as to couple the transmission element to the driving element and the driven mechanism,
- in the separation state, the ejector rod is separated from the driving element and the driven mechanism.

18. The external adjustment module of claim 17, further comprising a lip tracking element and an eye tracking element, wherein the lip tracking element is pivotally connected to the outer frame and used for tracking a lip, and the eye tracking element is disposed in the outer frame.

* * * * *